(12) United States Patent
Matsumoto

(10) Patent No.: US 6,317,162 B1
(45) Date of Patent: Nov. 13, 2001

(54) DIGITAL TELEVISION RECEIVER INCLUDING NON-VOLATILE MEMORY

(75) Inventor: Kiyoshi Matsumoto, Izumi (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/427,187

(22) Filed: Oct. 26, 1999

(30) Foreign Application Priority Data

Oct. 29, 1998 (JP) .................................................. 10-308422

(51) Int. Cl.$^7$ ...................................................... H04N 5/44
(52) U.S. Cl. ........................... 348/553; 348/725; 348/720
(58) Field of Search .................................... 348/553, 563, 348/569, 714, 720, 725; H04N 5/44, 9/64, 5/445

(56) References Cited

U.S. PATENT DOCUMENTS

| | | | |
|---|---|---|---|
| 4,750,040 | * | 6/1988 | Hakamada ............................ 348/725 |
| 5,303,063 | * | 4/1994 | Kim ...................................... 348/725 |
| 5,440,632 | | 8/1995 | Bacon et al. ............................ 380/20 |
| 5,617,146 | * | 4/1997 | Duffield ............................... 348/553 |
| 5,666,293 | | 9/1997 | Metz et al. ........................ 395/200.5 |
| 5,734,853 | | 3/1998 | Hendricks et al. .................. 395/352 |

FOREIGN PATENT DOCUMENTS 0 748 132 A2   12/1996  (EP) .
0 875 824 A1   11/1998  (EP) .

\* cited by examiner

Primary Examiner—Sherrie Hsia
(74) Attorney, Agent, or Firm—Armstrong, Westerman, Hattori, McLeland & Naughton, LLP

(57) ABSTRACT

A digital television receiver comprises first program rewriting unit for downloading a program sent by broadcasting to rewrite the contents of a first non-volatile memory, an electrically rewritable second non-volatile memory storing identification information indicating whether the program has been normally rewritten by the program rewriting unit or the program has not been normally rewritten by the shutoff of the power during the rewriting, and second program rewriting unit for checking the identification information when a control portion in the receiver is activated, and downloading the program sent by broadcasting again to rewrite the contents of the first non-volatile memory when it is detected that the program has not been normally rewritten.

2 Claims, 4 Drawing Sheets

DIGITAL TELEVISION RECEIVER INCLUDING NON-VOLATILE MEMORY

BACKGROUND OF THE INVENTION

1. Field of the Invention

The present invention relates to a digital television receiver.

2. Description of the Prior Art

In a multi-channel digital satellite broadcasting (CS broadcasting) system using CS (Communication Satellite) which has been started in recent years, a lot of (for example, 100 or more) channels are prepared, and a lot of programs are provided.

In such broadcasting, there are functions which have not been so far seen. For example, guide information relating to programs which are being currently broadcast and programs which will be broadcast in the future, together with original program data, are transmitted at predetermined time intervals, and a viewer can select and view the program on the basis of the program guide (electronic program guide [EPG]) information.

In such a digital television receiver, a ROM whose contents cannot be generally rewritten has been employed as a program ROM. For convenience of a CS broadcasting form, it is prescribed that a rewritabie ROM is mounted as a program ROM (hereinafter referred to as a program memory) as a standard in order to change the specification thereof and improve the function thereof.

When the rewritable program memory is mounted on the digital television receiver, it is possible to rewrite the contents of the program memory by sending a rewriting program by a broadcast wave.

When the power is shut off on the basis of a power failure or the power is shut off on the basis of a user operation while the contents of the program memory are being rewritten utilizing the broadcast wave, however, a program for a control portion in the receiver is not normally rewritten. Accordingly, the contents of the program memory must be rewritten by a repairing person.

When the control portion is reactivated upon normal completion of the rewiring of the program, the structures of data stored in a non-volatile data area change depending on the program which has been rewritten. Therefore, the data structures must be manually reset.

SUMMARY OF THE INVENTION

An object of the present invention is to provide a digital television receiver in which in a case where a program is not normally rewritten by the shutoff of the power based on a power failure or the shutoff of the power based on a user operation while the contents of a program memory are being rewritten utilizing a broadcast wave, the program is automatically rewritten when the power is returned.

A television receiver according to the present invention is characterized by comprising a control portion for controlling the whole of the receiver; an electrically rewritabie first non-volatile memory storing an execution program for the control portion; first program rewriting means for downloading a program sent by broadcasting to rewrite the contents of the first non-volatile memory; an electrically rewritable second non-volatile memory storing identification information indicating whether the program has been normally rewritten by the program rewriting means or the program has not been normally rewritten by the shutoff of the power during the rewriting; second program rewriting means for checking the identification information when the control portion is activated, and downloading the program sent by broadcasting again to rewrite the contents of the first non-volatile memory when it is detected that the program has not been normally rewritten; and means for changing, when the program has been normally rewritten by the second program rewriting means, the identification information into information indicating that the program has been normally rewritten.

It is preferable that there is provided means for initializing the second non-volatile memory when the control portion is first activated after the program is normally rewritten.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
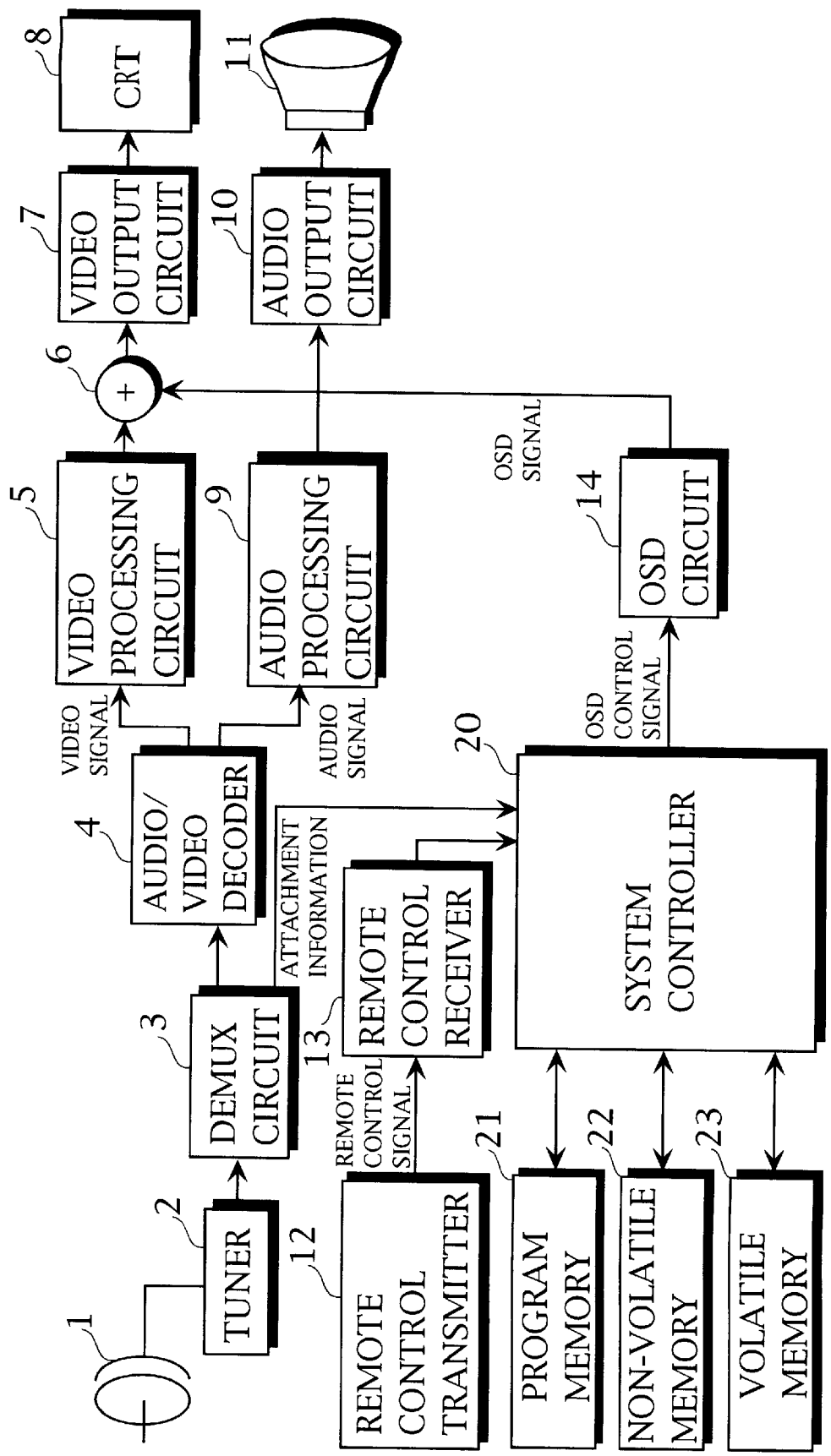
FIG. 1 is a block diagram showing the configuration of a digital television receiver.

Referring now to the drawings, an embodiment of the present invention will be described.

FIG. 1 illustrates the configuration of a digital television receiver having the function of receiving CS digital broadcasting.

A CS broadcast wave utilizing communication satellite (CS) is sent to a CS tuner 2 through a CS antenna 1, where it is subjected to high-frequency processing and demodulation. An output from the CS tuner 2 is sent to a DEMUX circuit 3, where packets are demodulated.

In the DEMUX circuit 3, the packets are classified into MPEG (Motion Picture Expert Group) data and attachment information such as program guide information. The MPEG data obtained by the classification in the DEMUX circuit 3 is sent to an audio/video decoder 4. The attachment information such as the program guide information obtained by the classification in the DEMUX circuit 3 is sent to a system controller 20.

The system controller 20 comprises a program memory 21 composed of a flash memory, a non-volatile memory 22 composed of an EEPROM (Electrically Erasable and Programmable ROM), and a volatile memory 23 composed of a RAM in this example. The program memory 21 stores a program for the system controller 20. The non-volatile memory 22 stores a download flag, described later, and various types of data. The volatile memory 23 stores download data, described later, and the other necessary data.

The system controller 20 causes the attachment information sent from the DEMUX circuit 3 to be stored in the volatile memory 23. A remote control signal from a remote control transmitter 12 is inputted to the system controller 20 through a remote control receiver 13.

The system controller 20 sends information for channel selection, for example, to the tuner 2 and the DEMUX circuit 3. The system controller 20 sends to an OSD (On-Screen Display) circuit 14 an OSD control signal for on-screen displaying a program guide for CS broadcasting, various types of setting screens for CS broadcasting, and so forth on a CRT (Cathode-Ray Tube) 8. The OSD circuit 14 produces display data representing a program guide or the like, and sends the display data to a multiplexer (a synthesis circuit) 6.

The audio/video decoder 4 demodulates MPEG data sent from the DEMUX circuit 3. A video signal obtained by the audio/video decoder 4 is sent to the multiplexer 6 through a video processing circuit 5. The multiplexer 6 superimposes the display data sent from the OSD circuit 14 on video data outputted from the video processing circuit 5, and sends data after the superimposition to a video output circuit 7. A video signal outputted from the video output circuit 7 is sent to the CRT 8.

An audio signal obtained by the audio/video decoder 4 is sent to a speaker 11 through an audio processing circuit 9 and an audio output circuit 10.

In the present embodiment, rewriting program (hereinafter referred to as download data) for the program memory 21 is also sent out by broadcasting. When the download data is being sent out by broadcasting, the system controller 20 acquires a download control table (DCT) on the basis of the attachment information. The download control table includes a maker ID, a model ID, and a version ID.

The system controller 20 judges whether or not the maker ID and the model ID are adapted to the digital television receiver, and judges, when they are adapted to the receiver, whether or not the version ID is newer than that of a program currently carried. When the version ID is newer than that of the program currently carried, download is started.

When the version ID is newer than that of the program currently carried, the system controller 20 may indicate that the download can be started and cause a user to enter an instruction to perform the download.

Figure 2:
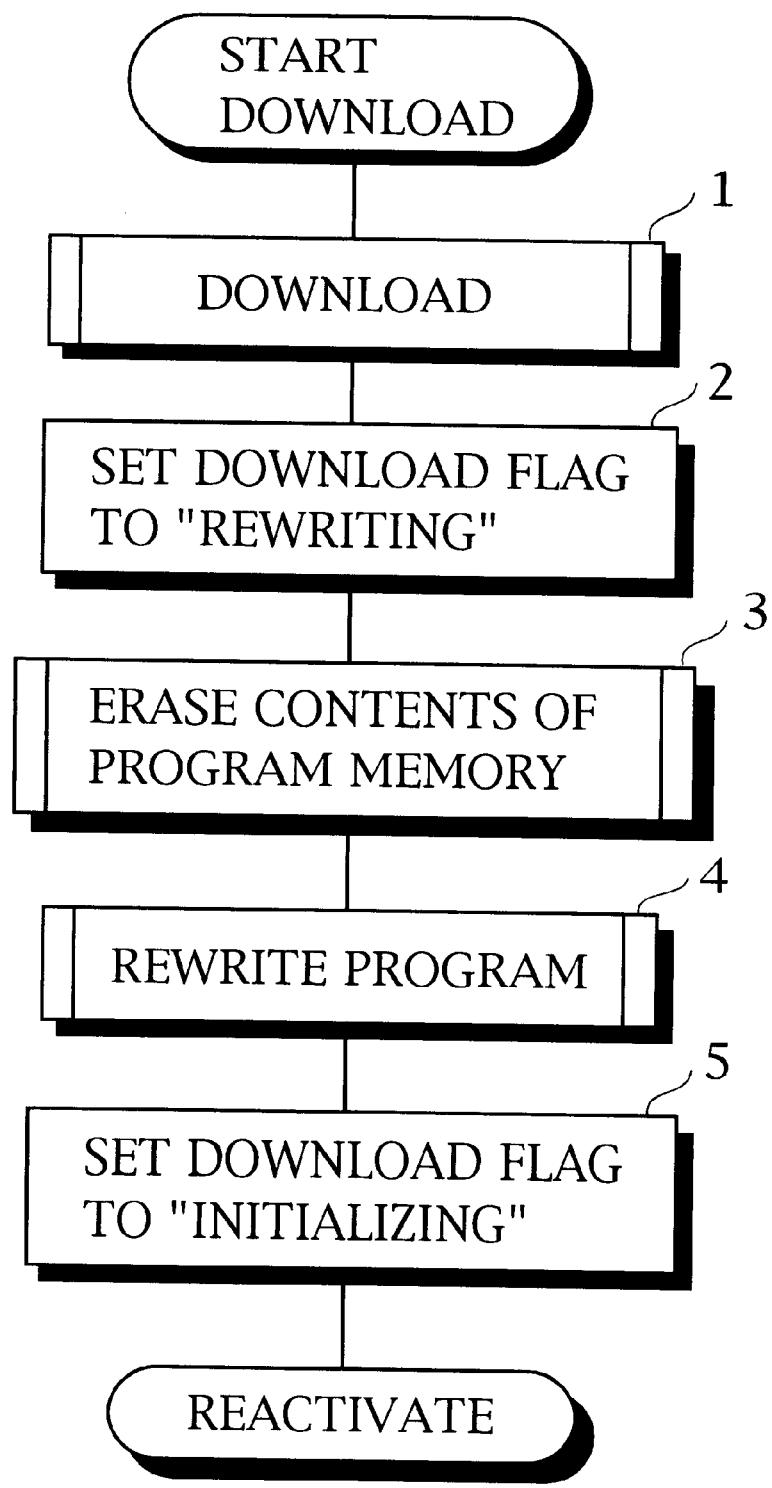
FIG. 2 is a flow chart showing the procedure for processing performed by a system controller 20 when download is started.

FIG. 2 shows the procedure for processing performed by the system controller 20 when the download is started.

When the download of the rewriting program is started, binary data representing the rewriting program which is to be stored in the program memory 21 is stored in the volatile memory 23 (step 1). Generally, time required to download the rewritable program is approximately 10 minutes.

When the download is completed, a download flag F which is to be stored in the non-volatile memory 22 is set to "rewriting" (step 2). For example, the download flag F is composed of two bits, and stores three states, i.e., clear "00", rewriting "01", and initializing "11".

The contents of the program memory 21 are then erased (step 3). Thereafter, program rewriting processing is performed (step 4). That is, the data representing the rewriting program which has been stored in the volatile memory 23 at the foregoing step 1 are successively written into the program memory 21.

When the writing of the rewriting program into the program memory 21 is terminated, the download flag F is set to "initializing" (step 5). Thereafter, the system controller 20 is reactivated.

When the power is shut off while the processing at the foregoing step 1 is being performed, that is, the rewriting program is being downloaded, the download data which have been stored in the volatile memory 23 until the power is shut off are erased. In this case, the contents of the program memory 21 are not rewritten at all. After the power is returned, therefore, the digital television receiver is normally operated as a digital television broadcasting receiver before the shutoff of the power.

When the power is shut off in a time period elapsed from the time when the contents of the program memory 21 are erased at the foregoing step 3 until the writing of the rewriting program into the program memory 21 is terminated, that is, in a time period elapsed from the time when the download flag F is set to "rewriting" until the download flag F is set to "initializing", the contents of the program memory 21 become incomplete. When no processing is performed when the power is returned (when the system controller 20 is activated), therefore, the digital television receiver is not normally operated as a digital television broadcasting receiver. In the present embodiment, the following processing is performed when the system controller 20 is activated.

Figure 3:
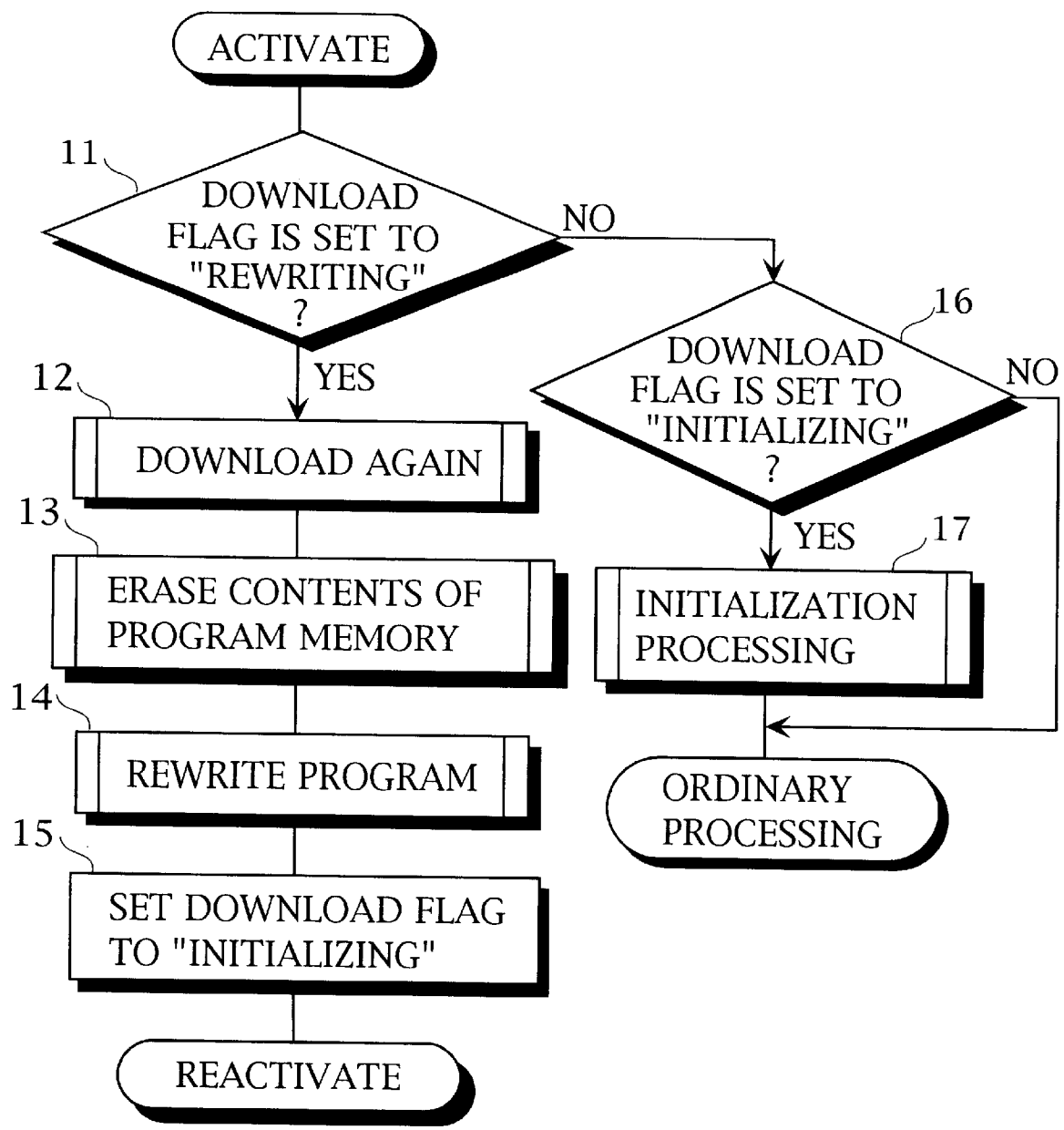
FIG. 3 is a flow chart showing the procedure for processing performed by the system controller 20 when the system controller 20 is activated.

FIG. 3 shows the procedure for processing performed by the system controller 20 when the system controller 20 is activated.

When the system controller 20 is activated, it is judged whether or not the download flag F is set to "rewriting" (step 11). When the download flag F is not set to "rewriting", it is judged whether or not the download flag F is set to "initializing" (step 16). When the download flag F is not set to "initializing", that is, the download flag F is in a cleared condition, ordinary processing is performed.

When it is judged at the step 16 that the download flag F is set to "initializing", it is judged that the current activation is the first activation after the program is normally rewritten. Accordingly, initialization processing of the non-volatile memory 22 is performed (step 17). Thereafter, ordinary processing is performed. In the initialization processing of the non-volatile memory 22, the download flag F is cleared.

When the download flag F is set to "rewriting" at the foregoing step 11, it is judged that the power is shut off in a time period elapsed from the time when the contents of the program memory 21 are erased at the step 3 shown in FIG. 2 until the writing of the rewriting program into the program memory 21 is terminated. Accordingly, the rewriting program is downloaded again (step 12). That is, the binary data representing the rewriting program which is to be stored in the program memory 21 is stored in the volatile memory 23.

When the download is completed, the contents of the program memory 21 are erased (step 13). Thereafter, program rewriting processing is performed (step 14). That is, the data representing the rewriting program which have been stored in the volatile memory 23 at the foregoing step 12 are successively written into the program memory 21.

When the writing of the rewriting program into the program memory 21 is terminated, the download flag F is set to "initializing" (step 15). Thereafter, the system controller 20 is reactivated. When the system controller 20 is reactivated, the answer is in the negative at the step 11, and the answer is in the affirmative at the step 16. After the initialization processing of the non-volatile memory 22 is performed (step 17), ordinary processing is performed.

The processing at the steps 11 to 14 shown in FIG. 3 must be performed even when the power is returned after the program is normally rewritten. Therefore, a program for performing the processing at the steps 11 to 14 is not erased at the step 3 shown in FIG. 2 or the step 13 shown in FIG. 3.

Figure 4:
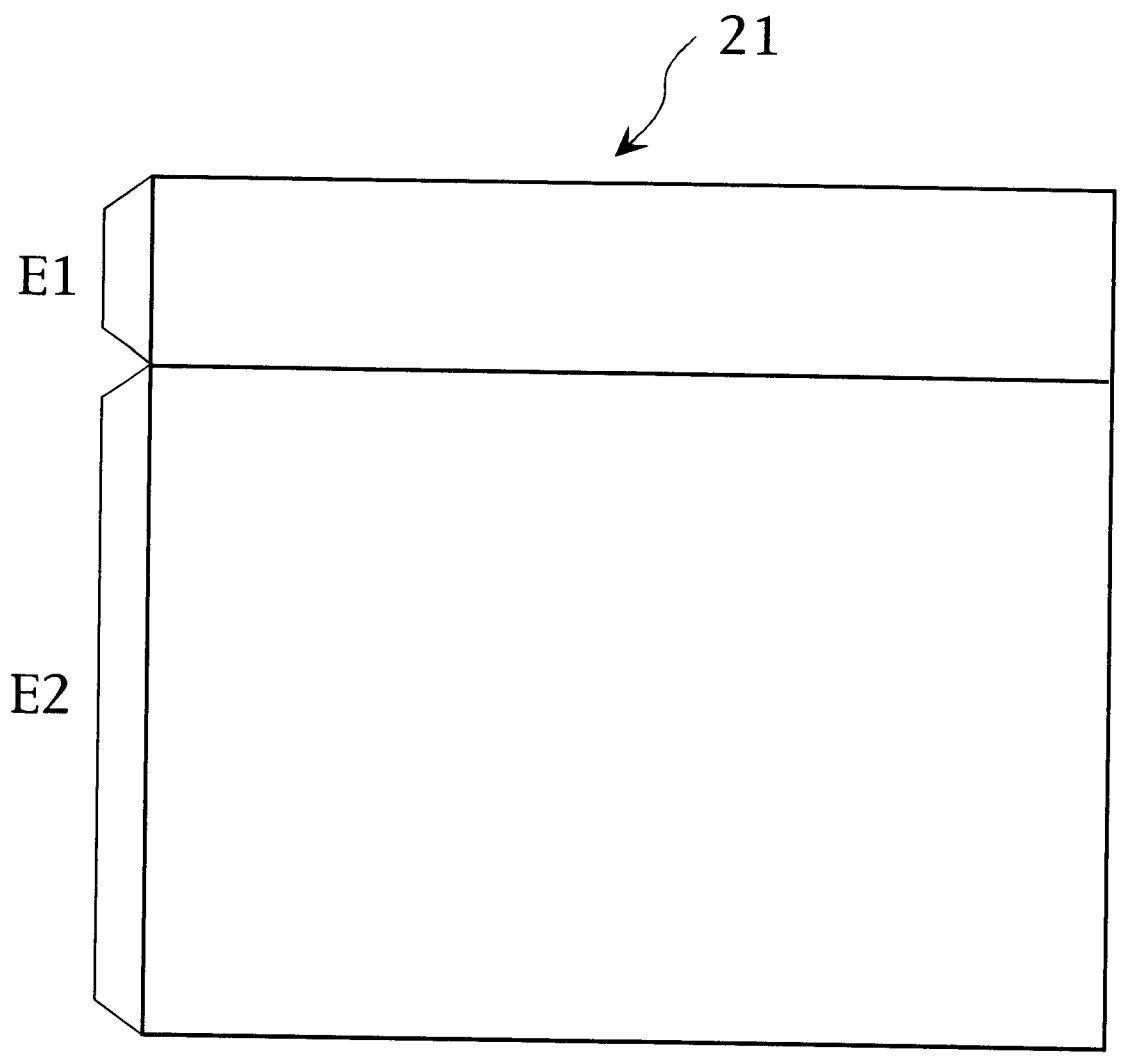
FIG. 4 is a schematic view showing the contents of a program memory 21.

The program memory 21 comprises an area E1 for storing a program for performing the processing at the steps 11 to 14 and an area E2 for storing the other programs, as shown in FIG. 4. At the step 3 or the step 13, only the contents of the area E2 are erased.

According to the present embodiment, when the program is not normally rewritten by the shutoff of the power based on a power failure or the shutoff of the power based on a user operation while the program memory is being rewritten, the program is automatically rewritten when the power is returned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A television receiver comprising:

a control portion for controlling the whole of the receiver;

an electrically rewritable first non-volatile memory storing an execution program for the control portion;

first program rewriting means for downloading a program sent by broadcasting to rewrite the contents of the first non-volatile memory;

an electrically rewritable second non-volatile memory storing identification information indicating whether the program has been normally rewritten by the first program rewriting means or the program has not been normally rewritten by the shutoff of the power during the rewriting;

second program rewriting means for checking the identification information when the control portion is activated, and downloading the program sent by broadcasting again to rewrite the contents of the first non-volatile memory when it is detected that the program has not been normally rewritten; and means for changing, when the program has been normally rewritten by the second program rewriting means, the identification information into information indicating that the program has been normally rewritten.

2. The digital television receiver according to claim 1, further comprising means for initializing the second non-volatile memory when the control portion is first activated after the program is normally rewritten.

* * * * *